(12) United States Patent  (10) Patent No.: US 9,130,752 B2
Cruzado et al.  (45) Date of Patent: Sep. 8, 2015

(54) TAMPER-RESISTANT COATING FOR AN INTEGRATED CIRCUIT

(71) Applicant: Honeywell International Inc., Morristown, NJ (US)

(72) Inventors: Edwin David Cruzado, Plant City, FL (US); William J. Dalzell, Parrish, FL (US)

(73) Assignee: Honeywell International Inc., Morristown, NJ (US)

( * ) Notice: Subject to any disclaimer, the term of this patent is extended or adjusted under 35 U.S.C. 154(b) by 194 days.

(21) Appl. No.: 13/685,189

(22) Filed: Nov. 26, 2012

(65) Prior Publication Data

US 2014/0145353 A1    May 29, 2014

(51) Int. Cl.
*G06F 21/00* (2013.01)
*H04L 9/28* (2006.01)
*H01L 23/552* (2006.01)
*H04L 9/08* (2006.01)
*H01L 23/31* (2006.01)
*H01L 23/00* (2006.01)
*H01L 25/18* (2006.01)

(52) U.S. Cl.
CPC .............. *H04L 9/28* (2013.01); *H01L 23/3135* (2013.01); *H01L 23/552* (2013.01); *H01L 23/576* (2013.01); *H04L 9/0861* (2013.01); *H01L 24/16* (2013.01); *H01L 24/32* (2013.01); *H01L 24/48* (2013.01); *H01L 25/18* (2013.01); *H01L 2224/16225* (2013.01); *H01L 2224/32225* (2013.01); *H01L 2224/48227* (2013.01); *H01L 2924/14* (2013.01); *H01L 2924/1434* (2013.01); *H01L 2924/15192* (2013.01); *H01L 2924/19041* (2013.01); *H01L 2924/19042* (2013.01); *H01L 2924/19043* (2013.01); *H01L 2924/19105* (2013.01); *H01L 2924/3025* (2013.01); *H04L 2209/127* (2013.01)

(58) Field of Classification Search
CPC ............ G06F 21/87; G06F 21/88; H04L 9/28
USPC ......... 380/28, 29, 44, 270; 713/189; 438/123; 257/659, 787
See application file for complete search history.

(56) References Cited

U.S. PATENT DOCUMENTS

| 6,320,137 | B1 | 11/2001 | Bonser et al. |
| 6,351,030 | B2 | 2/2002 | Havens et al. |
| 6,929,900 | B2 | 8/2005 | Farquhar et al. |
| 7,196,275 | B2 | 3/2007 | Babb et al. |
| 7,971,350 | B2 | 7/2011 | Joshi |
| 7,978,070 | B2 | 7/2011 | Hunter |
| 8,004,419 | B2 * | 8/2011 | Thornley et al. .............. 340/657 |

(Continued)

*Primary Examiner* — Justin T Darrow
*Assistant Examiner* — Hee Song
(74) *Attorney, Agent, or Firm* — Shumaker & Sieffert, P.A.

(57) ABSTRACT

A system may include an integrated circuit and a coating at least partially encapsulating the integrated circuit. The coating may include an electrically insulating material at least partially encapsulating an analog circuit. The integrated circuit may be electrically connected to the analog circuit. Additionally, the integrated circuit may be configured to generate an analog electrical signal, transmit the analog electrical signal through the analog circuit to generate a modified analog electrical signal, receive the modified analog electrical signal, and in response to determining that the modified analog electrical signal is sufficiently similar to an expected analog electrical signal, use the modified analog electrical signal as an input to an algorithm performed by the integrated circuit.

17 Claims, 4 Drawing Sheets

(56) References Cited

U.S. PATENT DOCUMENTS

| | | |
|---|---|---|
| 8,084,855 B2 | 12/2011 | Lower et al. |
| 8,093,691 B1 | 1/2012 | Fuentes et al. |
| 8,156,640 B2 | 4/2012 | Dudnikov, Jr. et al. |
| 8,168,892 B2 | 5/2012 | Kauppinen et al. |
| 8,173,906 B2 | 5/2012 | Bedinger et al. |
| 8,516,269 B1 * | 8/2013 | Hamlet et al. ............... 713/189 |
| 2009/0065916 A1 | 3/2009 | Crane et al. |

* cited by examiner

TAMPER-RESISTANT COATING FOR AN INTEGRATED CIRCUIT

TECHNICAL FIELD

The disclosure relates to coatings for protecting an integrated circuit against tampering.

BACKGROUND

Integrated circuit (ICs), such as memory devices, application-specific integrated circuits (ASICs), field-programmable gate arrays (FPGAs), general purpose processors, or the like, can store or include proprietary information. Because of this, competitors or other individuals or governments may attempt to reverse engineer ICs to ascertain their contents or design. This may be disadvantageous to the manufacturer of the IC and/or legitimate users of the IC.

SUMMARY

The disclosures describes devices and systems including an active tamper-resistant coating, and methods for forming or using the active tamper-resistant coating and the devices and systems including the active tamper-resistant coating. In some aspects, the disclosure describes a system including an IC and tamper-resistant coating that at least partially encapsulates (e.g., partially encapsulates or fully encapsulates) the IC. The tamper-resistant coating may include an analog circuit and an electrically insulative material that at least partially encapsulates the analog circuit. The IC may be electrically connected to the analog circuit.

The analog circuit may include at least one analog circuit element, such as at least one resistor, inductor, and/or capacitor. The IC may be configured to generate an analog electrical signal and transmit the signal through the analog circuit. The analog circuit may affect characteristics of the analog electrical signal, such as phase, frequency, voltage, current, or the like. The analog electrical signal thus may be modified by the analog circuit to generate a modified analog electrical signal. The effect of the analog circuit on the analog electrical signal may be described by a transfer function.

The IC may be configured to sense the modified analog electrical signal. The IC may be configured to then compare the modified analog electrical signal to a predicted analog electrical signal. The IC may predict the predicted analog electrical signal based at least in part on the analog electrical signal (as transmitted by the IC) and the transfer function. The IC may further be configured to, in an instance in which the IC determines that the modified analog electrical signal is sufficiently similar to the predicted analog electrical signal, use the modified electrical signal as an input to an algorithm performed by the integrated circuit. For example, the IC may be configured to generate a key, such as an encryption or decryption key or an authentication key, based on the modified analog electrical signal. The IC then may be configured to use the key in operation of the IC, e.g., to encrypt or decrypt data stored by the IC or to authenticate trust with another entity. In some examples, the IC may be configured to, in an instance in which the IC determines that the modified analog electrical signal is sufficiently similar to the predicted analog electrical signal, modify data stored by the IC.

The analog circuit may be at least partially encapsulated within the electrically insulative material of the tamper-resistant coating, such that if a reverse engineer attempts to remove or modify the coating, the analog circuit may be damaged. Damage to the analog circuit may change electrical characteristics of the analog circuit so that the modified analog electrical signal will no longer be sufficiently similar to the predicted analog electrical signal. Thus, the IC may not function properly when a reverse engineer tampers with tamper-resistant coating.

In one aspect, the disclosure describes a system that includes an IC and coating at least partially encapsulating the IC. In accordance with this aspect of the disclosure, the coating may include electrically insulating material at least partially encapsulating an analog circuit. The IC may be electrically connected to the analog circuit. Additionally, the IC may be configured to generate an analog electrical signal, transmit the analog electrical signal through the analog circuit to generate a modified analog electrical signal, receive the modified analog electrical signal, compare the modified analog electrical signal to an expected analog electrical signal and in an instance in which the modified analog electrical signal is sufficiently similar to the expected analog electrical signal, use the modified analog electrical signal as an input to an algorithm performed by the integrated circuit.

In another aspect, the disclosure describes a method that includes mechanically and electrically connecting an IC to a printed board (PB). In accordance with this aspect of the disclosure, the method also may include forming a coating over the IC, wherein the coating at least partially encapsulates the IC. The coating may include an electrically insulating material at least partially encapsulating an analog circuit. The method additionally may include electrically connecting the printed board to the analog circuit to electrically connect the IC and the analog circuit. In accordance with this aspect of the disclosure, the IC may be configured to generate an analog electrical signal, transmit the analog electrical signal through the analog circuit to generate a modified analog electrical signal, receive the modified analog electrical signal, compare the modified analog electrical signal to an expected analog electrical signal; and in an instance in which the modified analog electrical signal is sufficiently similar to the expected analog electrical signal, use the modified analog electrical signal as an input to an algorithm performed by the integrated circuit.

In a further aspect, the disclosure describes a method that includes generating, by an IC, an analog electrical signal, wherein the IC is at least partially encapsulated in a coating, wherein the coating comprises an electrically insulating material at least partially encapsulating an analog circuit. In accordance with this aspect of the disclosure, the method also may include transmitting, by the IC, the analog electrical signal through the analog circuit to generate a modified analog electrical signal and receiving, by the IC, the modified analog electrical signal. The method further may include comparing the modified analog electrical signal to an expected analog electrical signal, and, in an instance in which the modified analog electrical signal is sufficiently similar to the expected analog electrical signal, using, by the IC, the modified analog electrical signal as an input to an algorithm performed by the integrated circuit.

The details of one or more examples are set forth in the accompanying drawings and the description below. Other features, objects, and advantages will be apparent from the description and drawings, and from the claims.

DETAILED DESCRIPTION

Figure 1:
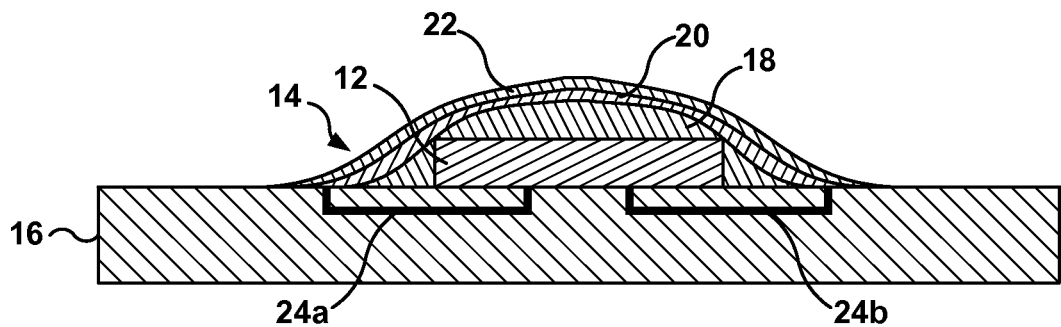
FIG. 1 is a conceptual diagram illustrating a schematic side cross-sectional view of an example IC at least partially encapsulated by an active tamper-resistant coating.

In some examples, the disclosure describes a system that includes a tamper-resistant coating applied to an IC. Example tamper-resistant coatings described herein incorporate an analog circuit through which the IC is configured to transmit an analog electrical signal. The analog circuit is configured to modify one or more characteristics of the analog electrical signal, and the IC is configured compared the modified analog electrical signal to a predicted analog electrical signal. The predicted analog electrical signal may be based on the transmitted analog electrical signal and a transfer function that describes the known effect of the analog circuit (e.g., in a baseline state in which it is known the circuit has not been tampered with) on the transmitted analog electrical signal. The IC may be configured to, in instances in which the modified analog electrical signal is sufficiently similar to the predicted analog electrical signal, use the modified analog electrical signal as an input for an algorithm performed by the IC. For example, the IC may be configured to use the modified analog electrical signal as an input for an algorithm performed by the IC in response to determining the modified analog electrical signal is sufficiently similar to the predicted analog electrical signal.

In some examples, the IC also may be configured to, in instances in which the modified analog electrical signal is not sufficiently similar to the predicted analog electrical signal, perform an action, such as encrypting data stored by the IC, modifying data stored by the IC, or deleting data stored by the IC. For example, the IC may be configured to perform the action in response to determining the modified analog electrical signal is not sufficiently similar to the predicted analog electrical signal.

Because the tamper-resistant coating includes an analog circuit and utilizes analog electrical signals transmitted through the analog circuit in preventing or reducing a likelihood of successful tampering, the tamper-resistant coating may be referred to as an active tamper-resistant coating.

Some proposed systems include a tamper-resistant coating applied to an IC, where the coating physically protects the IC from tampering. The coatings may be formulated such that attempted removal of the coating damages the IC. However, because of the value of intellectual property stored by or incorporated into some ICs, reverse-engineering techniques continually improve. For example, techniques have been developed to remove some tamper-resistant coatings from an IC without damaging the IC, e.g., using sequential washes with carefully selected chemicals.

Other systems include a tamper-resistant coating applied to an IC that includes at least one electrical conductor through which an electrical signal is conducted. When a sensor detects an electrical short circuit or an open circuit in the at least one electrical circuit, the sensor may modify data stored by the IC or damage the IC to render the intellectual property unretrievable. However, such a system may be defeated by forming an alternative conductive pathway for the electrical signal, so the at least one electrical conductor in the tamper-resistant coating may be removed from the IC without triggering the sensor.

While the tamper-resistant coating that includes the at least one electrical conductor and sensor configured to detect a short circuit or an open circuit, and the tamper-resistant coating that merely physically protects the IC from tampering may be useful, in some examples, an active tamper-resistant coating described herein may provide additional features not achieved by such tamper-resistant coatings. For example, by utilizing analog electrical signals transmitted through the analog circuit during operation of the IC, the active tamper-resistant coating and IC may be resistant against tampering accomplished by removing the coating from the IC, even if the IC is not damaged, as the IC may not function properly without the analog circuit being intact. The tamper-resistant coatings described herein may also hinder tampering performed by attempting to provide an alternate electrical pathway for the electrical signal, as the transfer function (the effect of the alternate electrical pathway on the analog electrical signal) is likely to be different than the transfer function of the analog circuit.

Figure 2:
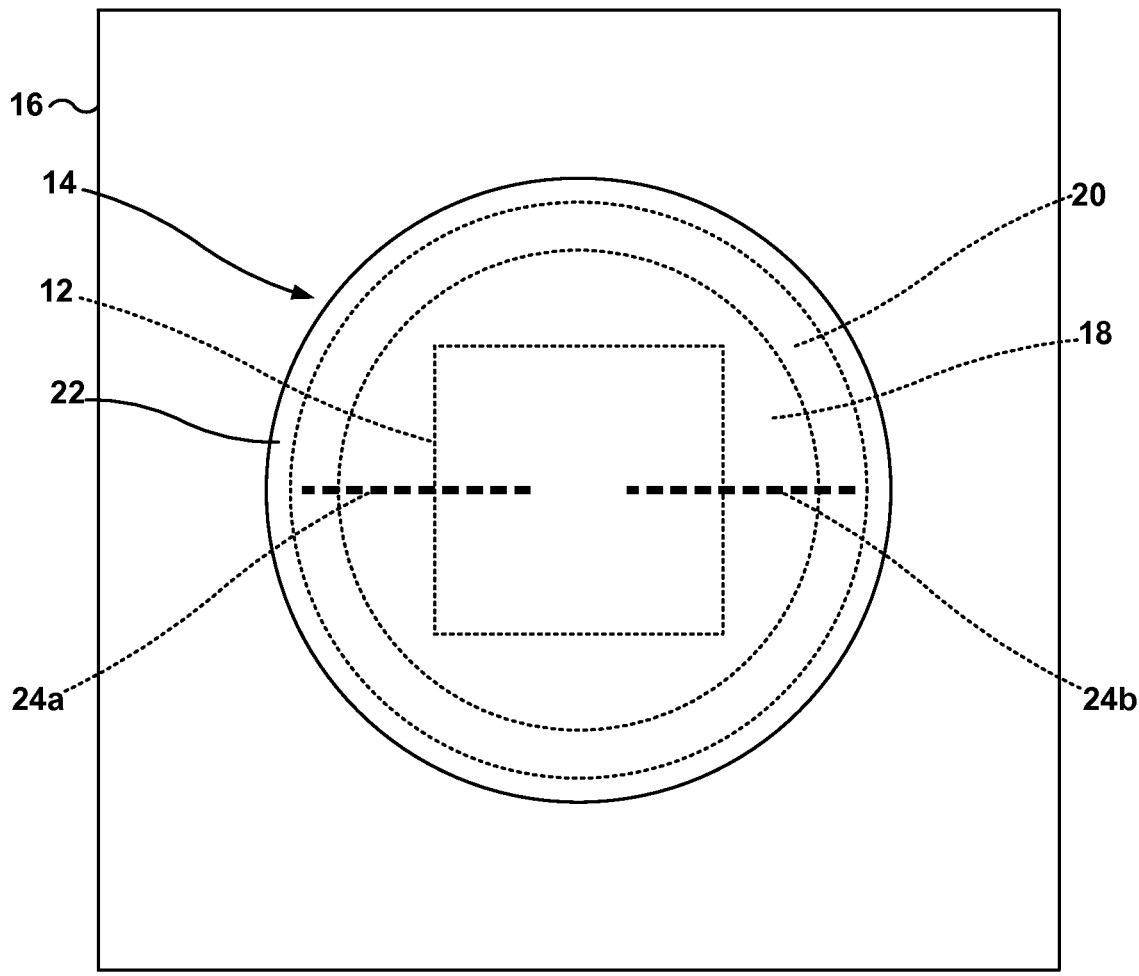
FIG. 2 is a conceptual diagram illustrating a top view of the example IC and active tamper-resistant coating illustrated in FIG. 1.

FIG. 1 is a conceptual diagram illustrating a side cross-sectional view of an example system that includes an IC 12 at least partially encapsulated within an active tamper-resistant coating 14. FIG. 2 is a conceptual diagram illustrating a top view of the example IC 12 and the example active tamper-resistant coating 14 illustrated in FIG. 1.

Active tamper-resistant coating 14 may include a first electrically insulating layer 18, an analog circuit 20, and a second electrically insulating layer 22. IC 12 may include any type of integrated circuit, including for example, a memory IC, an ASIC, a FPGA, a general purpose processor, a system-on-a-chip, or the like.

As shown in FIG. 1, IC 12 may, in some examples, be mechanically and electrically connected to a printed board (PB) 16, which may also be referred to as a printed wiring board in some examples. PB 16 may include an electrically insulating substrate and a plurality of electrical traces formed on a surface of the PB 16, on planes between layers of the electrically insulating substrate, or both. The electrical traces may form electrical connections among a plurality of electrical components, such as resistors, inductors, capacitors, transformers, or ICs, mounted on a surface of PB 16. Although only a single IC 12 is shown as mounted to the surface of PB 16 in FIG. 1, in other examples, a plurality of electrical components may be mounted to the surface of PB 16 and electrically connected to electrical traces of PB 16 (e.g., FIG. 6).

PB 16 includes a first electrical trace 24a and a second electrical trace 24b (collectively, "electrical traces 24") in the example of FIG. 1. Electrical traces 24 electrically connect IC 12 to analog circuit 20. Although two electrical traces 24 are illustrated as connecting IC 12 to analog circuit 20 in the example of FIG. 1, in other examples, more than two electrical traces 24 may electrically connect IC 12 to analog circuit 20. Each of electrical traces 24 may connect IC 12 to analog circuit 20 at a respective location of analog circuit 20.

Figure 6:
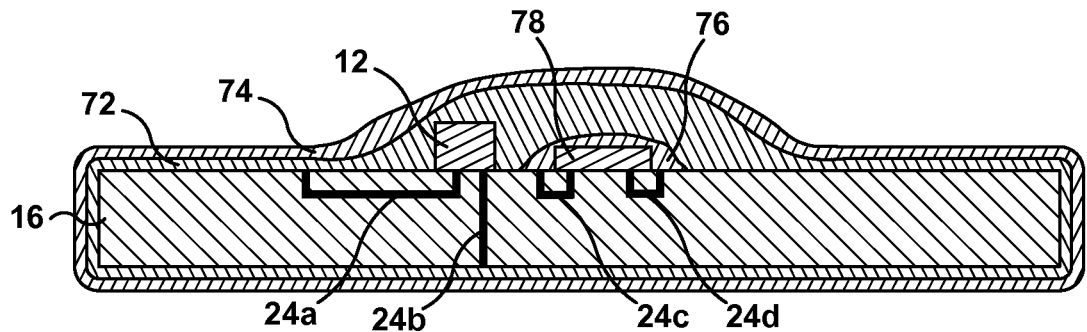
FIG. 6 is a conceptual diagram illustrating a schematic side cross-sectional view of another example IC at least partially encapsulated by an active tamper-resistant coating.

Active tamper-resistant coating 14 at least partially encapsulates IC 12. As shown in FIG. 1, in some examples, this may mean that active tamper-resistant coating 14 substantially fully (e.g., fully or nearly fully) covers IC 12 on multiple sides of IC 12 while leaving at least one side uncovered (e.g., a bottom surface 13 of IC 12 is not covered by active tamper-resistant coating 14, as bottom surface 13 is mechanically and electrically connected to PB 16). In other examples, at least partially encapsulating IC 12 may mean that active tamper-resistant coating 14 covers at least a portion of at least one surface of IC 12 (while covering all, some or none of the other surfaces of IC 12). In some examples, active tamper-resistant coating 14 may substantially fully (e.g., fully or nearly fully) encapsulate IC 12. For example, as shown in FIG. 6 and described below, an active tamper-resistant coating 72 may substantially (e.g., fully or nearly fully) fully encapsulate IC 12 and PB 16.

Active tamper-resistant coating 14 may include a first electrically insulating layer 18. First electrically insulating layer 18 may include any electrically insulating material, such as an electrically insulating polymer, ceramic, or the like. In some examples, first electrically insulating layer 18 includes an electrically insulating polymer, such as, for example, an electrically insulating epoxy, silicone, or the like.

In some examples, first electrically insulating layer 18 may be applied in a state or using a process that allows the first electrically insulating layer 18 to cover all exposed surfaces of IC 12, as shown in FIGS. 1 and 2. For example, when first electrically insulating layer 18 includes an epoxy, silicone or other electrically insulating polymer, the epoxy, silicone, or other electrically insulating polymer may be deposited over IC 12 and a portion of PB 16 in a uncured state or suspended in a liquid carrier. For example, the material that forms first electrically insulating layer 18 may be sprayed, spread, dip coated, or the like over IC 12. The polymer then may be cured or the liquid carrier removed (e.g., evaporated) to form first electrically insulating layer 18.

In some instances, an outer surface (adjacent to analog circuit 20) of first electrically insulating layer 18 may approximately reproduce a shape of the structure over which the first electrically insulating layer 18 is formed (e.g., IC 12). In other examples, the outer surface of first electrically insulating layer 18 may not approximately reproduce the shape of the structure over which the first electrically insulating layer 18 is formed, as shown in FIG. 1.

Analog circuit 20 is formed over first electrically insulating layer 18. Analog circuit 20 includes at least one analog circuit element, which may be configured to modulate an electrical signal. For example, the at least one analog circuit element may include at least one of a conductor, a resistor, a capacitor, an inductor, a transistor, a diode, a memristor, or the like. In some examples, analog circuit 20 includes a plurality of analog circuit elements. Analog circuit 20 may be electrically connected to integrated circuit 12 by one or more electrical traces 24.

In some examples, analog circuit 20 includes a single conductive pathway. In these examples, an analog electrical signal generated by integrated circuit 12 and transmitted to analog circuit 20 follows the single conductive pathway through analog circuit 20. In other examples, analog circuit 20 may define a plurality of conductive pathways, and IC 12 may be electrically connected to analog circuit 20 by more than two electrical traces 24 (e.g., a plurality of electrical traces 24). Each of the electrical traces 24 may connect to analog circuit 20 at a respective location of analog circuit 20. In these examples, the conductive pathway through which the analog electrical signal is transmitted may depend on which of electrical traces 24 is used to input the analog electrical signal from IC 12 to analog circuit 20 and which of electrical traces 24 is used to output the analog electrical signal from analog circuit 20 to IC 12.

In examples in which IC 12 is electrically connected to analog circuit 20 by a plurality of electrical traces 24, analog electrical signal generating circuitry (not shown) within IC 12 may be connected to at least some of the plurality of electrical traces 24 by a demultiplexer. The demultiplexer may function as a single-input, multiple output-switch, and allows IC 12 to control to which of the plurality of electrical traces 24 connected to the demultiplexer the analog electrical signal is transmitted. Similarly, analog electrical sensing circuitry (not shown) within IC 12 may be connected to at least some of the plurality of electrical traces 24 by a multiplexer. The multiplexer may function as a multiple-input, single-output switch, and allows control of from which of the plurality of electrical traces 24 connected to the multiplexer the analog electrical signal is received.

In this way, in some examples, a plurality of electrical traces 24 electrically connected to analog circuit 20 at respective locations of analog circuit 20 may allow analog circuit 20 to be equivalent to a plurality of analog circuits by presenting a plurality of electrical pathways through which IC 12 may transmit the analog electrical signal. IC 12 may activate one or more analog circuits of a plurality of available analog circuits and generate one or more modified analog electrical signals via the activated analog circuits by at least selecting the one or more electrical traces through which IC 12 transmits one or more analog electrical signals. At least some of the plurality of electrical pathways be different from one another, e.g., may include different analog circuit elements in the electrical pathway. Hence, the effect on the analog electrical signal of one of the plurality of electrical pathways may be different than the effect on the analog electrical signal of at least one other of the plurality of electrical pathways.

In the example shown in FIGS. 1 and 2, active tamper-resistant coating 14 also includes a second electrically insulting layer 22. Second electrically insulating layer 22 is formed over analog circuit 20. Together, first electrically insulating layer 18 and second electrically insulating layer 22 at least partially encapsulate analog circuit 20. In some examples, first electrically insulating layer 18 and second electrically insulating layer 22 substantially fully (e.g., fully or nearly fully) encapsulate analog circuit 20.

Second electrically insulating layer 22 may include any of the materials from which first electrically insulting layer 22 may be formed, and may be formed using similar techniques. In some examples, first and second electrically insulating layer 18 and 22 include similar or substantially the same materials (e.g., the same or nearly the same materials). In other examples, second electrically insulating layer 22 may include different material(s) than first electrically insulating layer 18. Similarly, first and second electrically insulating layer 18 and 22 may be formed using the same technique or different techniques.

In some examples, the materials from which first electrically insulating layer 18 and second electrically insulating layer 22 are formed may be selected so that adhesion between first electrically insulating layer 18 and IC 12 (and/or adhesion between first electrically insulating layer 18 and PB 16) is greater than adhesion between first electrically insulating layer 18 and second electrically insulating layer 22 (and/or between first electrically insulating layer 18 and elements of analog circuit 20). By selecting the materials to provide this relationship between respective adhesion values, there may be a greater likelihood that analog circuit 20 will be damaged during attempted removal of coating 14 than if adhesion between first electrically insulating layer 18 and second electrically insulating layer 22 (and/or between first electrically insulating layer 18 and elements of analog circuit 20) is greater than adhesion between first electrically insulating layer 18 and IC 12 (and/or PB 16).

Operation of IC 12 and interaction between IC 12 and analog circuit 20 will be described with reference to the technique illustrated in FIG. 3 for purposes of description only. In other examples, IC 12 may implement a different technique in interaction with analog circuit 20. In the example technique of FIG. 3, IC 12 is configured to generate an analog electrical signal (32) and transmit the signal through analog circuit 20 via electrical traces 24 (34). IC 12 may generate the analog electrical signal with predefined signal characteristics, such as frequency, voltage or current amplitude, and the like. In some examples, the analog electrical signal includes a plurality of frequencies.

Analog circuit 20 includes at least one analog circuit element, which may modify at least one characteristic of the analog electrical signal, such as phase, frequency, voltage or current amplitude, or the like. The effect of analog circuit 20 on the analog electrical signal may be described by a transfer function. IC 12 may store the transfer function in a memory of IC 12 or another memory (e.g., electrically connected to IC 12 via PB 16), such that IC 12 can generate a predicted analog electrical signal based on the analog electrical signal and the transfer function, e.g., by applying the transfer function to a mathematical representation of the analog electrical signal. IC 12 generates the analog electrical signal, and, therefore, knows the characteristics of the analog electrical signal and can predict the effect of analog circuit 20 based on the transfer function.

In addition, or instead, the predicted analog electrical signal may be stored in a memory of IC 12 or another memory (e.g., IC 12 may not store the transfer function in memory and generate the predicted analog electrical signal based on the transfer function and the analog electrical signal, but may instead simply store the predicted analog electrical signal in memory). The predicted analog electrical signal represents a prediction of the resulting analog electrical signal after the analog electrical signal generated by IC 12 is transmitted through analog circuit 20.

In other examples, instead of storing the transfer function or the predicted analog electrical signal in memory, IC 12 may store in memory or generate using the transfer function one or more characteristics describing the predicted analog electrical signal. For example, IC 12 may store in memory one or more outputs of a fast Fourier transform (FFT) applied to the predicted analog electrical signal (e.g., frequency content of the predicted analog electrical signal).

IC 12 may be configured to receive the modified analog electrical signal (36), e.g., via one or more of electrical traces 24 of PB 16, and compare the modified analog electrical signal (the electrical signal after transmitting through analog circuit 20) to the predicted analog electrical signal to determine whether or not analog circuit 20 is intact (e.g., has or has not been tampered with) (38). In some examples, IC may 12 be configured to compare the modified analog electrical signal (the electrical signal after transmitting through analog circuit 20) to the predicted analog electrical signal by at least using a feature based or template based processing technique, which may be implemented by hardware, software, firmware, or both. In some examples, IC 12 may process the modified analog electrical signal using a signal processing technique, such as, for example, a FFT and compare the resulting data (e.g., frequency content of the modified analog electrical signal) to similar data from the predicted analog electrical signal. In other examples, IC 12 may compare the modified analog electrical signal to the predicted analog signal by at least comparing the time domain electrical signals using a template matching algorithm.

In an instance in which IC 12 determines that the modified analog electrical signal (or characteristics of the modified analog electrical signal) is sufficiently similar (e.g., the same or nearly the same) to the predicted analog electrical signal (or characteristics of the predicted analog electrical signal) (the "YES" branch of decision block (38)), IC 12 may use the modified analog electrical signal (or characteristics of the modified analog electrical signal) as an input for an algorithm during operation of IC 12. For example, IC 12 may use the modified analog electrical signal (or characteristics of the modified analog electrical signal) as an input for an algorithm during operation of IC 12 in response to determining the modified analog electrical signal (or characteristics of the modified analog electrical signal) is sufficiently similar (e.g., the same or nearly the same) to the predicted analog electrical signal (or characteristics of the predicted analog electrical signal).

As an example, IC 12 may use the modified analog electrical signal (or characteristics of the modified analog electrical signal) to generate a decryption key. IC 12 then may use the decryption key to decrypt data used in an algorithm or process performed by IC 12. As another example, IC 12 may use the modified analog electrical signal (or characteristics of the modified analog electrical signal) to generate an encryption key. IC 12 then may use the encryption key to encrypt data used in an algorithm or process performed by IC 12. In some examples, IC 12 may use the modified analog electrical signal (or characteristics of the modified analog electrical signal) as an input to an algorithm or process performed by the IC 12. In yet another example, the modified analog electrical signal (or characteristics of the modified analog electrical signal) may be used to authenticate trust between IC 12 and another device or element on PB 16 or off PB 16.

However, in an instance in which IC 12 determines that the modified analog electrical signal (or characteristics of the modified analog electrical signal) is not sufficiently similar (e.g., not the same or nearly the same) to the predicted analog electrical signal (or characteristics of the predicted analog electrical signal) (the "NO" branch of decision block (38)), IC 12 may determine that analog circuit 20 is not intact, e.g., has been bypassed, removed, or damaged. For example, IC 12 may determine that analog circuit 20 is not intact in response to determining the modified analog electrical signal (or characteristics of the modified analog electrical signal) is not sufficiently similar (e.g., not the same or nearly the same) to the predicted analog electrical signal (or characteristics of the predicted analog electrical signal). IC 12 then may perform a predefined action (42), such as encrypting data stored permanently or temporarily by IC 12, modifying data stored permanently or temporarily by IC 12, deleting data stored permanently or temporarily by IC 12, or the like. In this way, IC 12 may reduce a likelihood that a reverse engineer can access data stored by IC 12 by bypassing, modifying, or removing active tamper-resistant coating 14.

Figure 3:
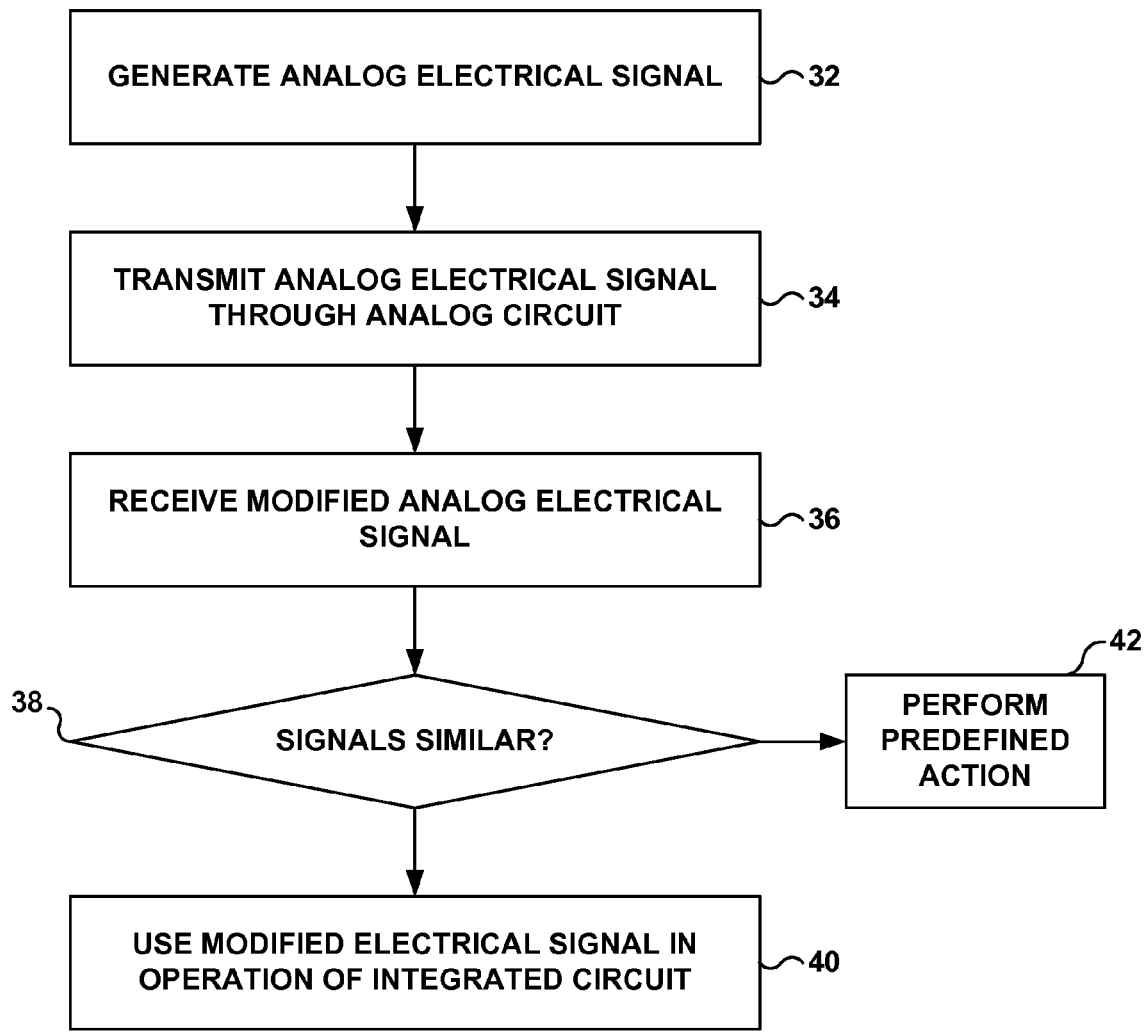
FIG. 3 is a flow diagram illustrating an example technique for utilizing an active tamper-resistant coating to protect intellectual property stored by an IC.

In some examples, IC 12 may be configured to perform the technique of FIG. 3 at multiple times over a period of time. For example, IC 12 may be configured to perform an algorithm, and at different steps of the algorithm, to require a validation that active tamper-resistant coating 14 is intact, e.g., by requiring an input based on a modified analog electrical signal, in order to continue performing the algorithm. IC 12 may determine that active tamper-resistant coating 14 is intact, e.g., using the technique shown in FIG. 3. The inputs required at the different steps of the algorithm may be the same or different.

In examples in which the inputs required are different for a first step and a second step, IC 12 may generate the first input by generating a first analog electrical signal having first signal characteristics (32), transmitting the first analog electrical signal through analog circuit 20 (34), receiving the first modified analog electrical signal (36), and comparing the first modified analog electrical signal to a first predicted analog electrical signal (38). Similarly, IC 12 may generate the second input by generating a second analog electrical signal having second signal characteristics (32), transmitting the second analog electrical signal through analog circuit 20 (34), receiving the second modified analog electrical signal (36), and comparing the second modified analog electrical signal to a second predicted analog electrical signal (38). When the first and second analog electrical signals are different (e.g., have at least one different signal characteristic), the first and second modified electrical signals may be different, and the first and second predicted analog electrical signals may be different. Using first and second inputs generated by first and second modified electrical signals may increase a complexity of operation of IC 12 and active tamper-resistant coating 14, which may make successful reverse engineering of the contents of IC 12 or circuit configuration of IC 12 less likely.

In some examples, as described above, IC 12 may be electrically connected to analog circuit 20 by a plurality of electrical traces 24. Each of the plurality of electrical traces 24 may electrically connect IC 12 to a respective location of analog circuit 20. Hence, the plurality of electrical traces 24 may provide a plurality of electrical pathways to and through analog circuit 20. In some instances, IC 12 may be configured to transmit analog electrical signals through different ones of the plurality of electrical pathways at different times. For example, IC 12 may be configured to perform an algorithm, and at different steps of the algorithm, to require a validation that active tamper-resistant coating 14 is intact, e.g., by requiring an input based on a modified analog electrical signal. The inputs required at the different steps of the algorithm may be the same or different.

In instances in which the inputs required are different for a first step and a second step, IC 12 may be configured to generate the first input by generating a first analog electrical signal (32), transmitting the first analog electrical signal through a first electrical pathway of the analog circuit 20 (34), receiving a first modified analog electrical signal (36), and comparing the first modified analog electrical signal to a first predicted analog electrical signal (38). IC 12 may transmit the first analog electrical signal through a particular pathway of analog circuit 20 by, for example, transmitting the first analog electrical signal through a particular electrical trace 24. Similarly, IC 12 may generate the second input by generating a second analog electrical signal (32), transmitting the second analog electrical signal through a second electrical pathway of the analog circuit 20 (34), receiving a second modified analog electrical signal (36), and comparing the second modified analog electrical signal to a first predicted analog electrical signal (38). When the first and second analog electrical pathways are different (e.g., due to different electrical traces 24 through which the analog signals are introduced into analog circuit 20), the first and second modified electrical signals may be different, and the first and second predicted electrical signals may be different. Additionally, in some examples, the first and second analog electrical signals may be different, e.g., may include different frequency content. Using first and second inputs generated by transmitting an analog electrical signal through first and second electrical pathways of analog circuit 20 may increase a complexity of operation of IC 12 and active tamper-resistant coating 14, which may make successful reverse engineering of the contents of IC 12 or circuit configuration of IC 12 less likely.

In this way, the system including IC 12 and active tamper-resistant coating 14 may provide one or more levels of anti-tamper protection. In some examples, active tamper-resistant coating 14 may provide passive, mechanical anti-tampering protection to IC 12 by possibly damaging IC 12 in response to attempts, by an adversary, to physically remove active tamper-resistant coating 14 from IC 12 using mechanical force or chemical means. In addition, or instead, the system may reduce a likelihood of successful reverse engineering of contents of IC 12 or a circuit configuration of IC 12 by requiring analog circuit 20 to be intact for IC 12 to function properly. In some examples, in addition to requiring analog circuit 20 to be intact to function properly, IC 12 may modify data stored by IC 12 or cause IC 12 to be physically damaged upon determining that analog circuit 20 is not intact (based on the modified analog electrical signal not being sufficiently similar to the predicted analog electrical signal). Thus, in some examples, IC 12 and active tamper-resistant coating 14 may provide multiple levels of anti-tampering protection for IC 12.

Figure 4:
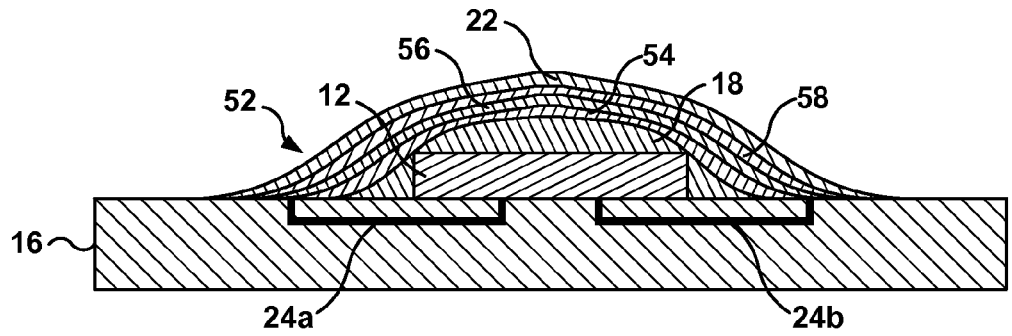
FIG. 4 is a conceptual diagram illustrating a schematic side cross-sectional view of another example IC at least partially encapsulated by an active tamper-resistant coating.
Figure 5:
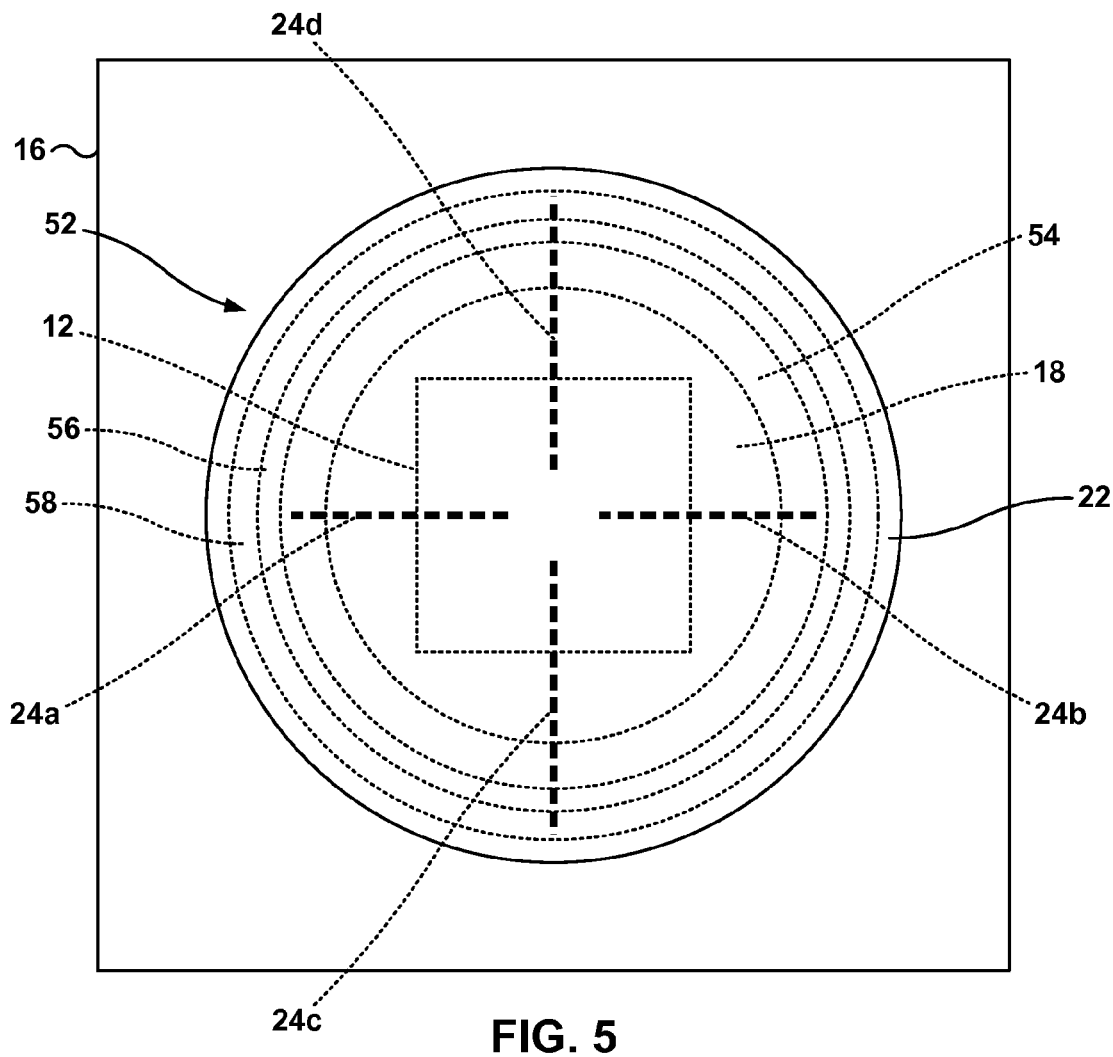
FIG. 5 is a conceptual diagram illustrating a top view of the example IC and active tamper-resistant coating illustrated in FIG. 4.

In some examples, an active tamper-resistant coating may include more than three layers. Additional layers may present additional complexity to a person attempting to reverse engineer contents of IC 12, which may reduce a likelihood of successful reverse-engineering. FIG. 4 is a conceptual diagram illustrating a side cross-sectional view of another example IC 12 at least partially encapsulated by an active tamper-resistant coating 52. FIG. 5 is a conceptual diagram illustrating a top view of the example IC 12 and active tamper-resistant coating 52 illustrated in FIG. 4. Active tamper-resistant coating 52 includes five layers, as opposed to the three layers of active tamper-resistant coating 14 of FIG. 1.

IC 12 and PB 16 may be similar to or substantially the same (e.g., the same or nearly the same) as described with reference to FIGS. 1 and 2. However, in contrast to FIGS. 1 and 2, PB 16 includes four electrical traces 24a-24d. First electrical trace 24a and second electrical trace 24b electrically connect IC 12 to first analog circuit layer 54. Third electrical trace 24c and fourth electrical trace 24d electrically connect IC 12 to second analog circuit layer 58 (FIG. 5).

First electrically insulating layer 18 and second electrically insulating layer 22 may be the similar to or substantially the same (e.g., the same or nearly the same) as the corresponding layers illustrated in FIG. 1. In contrast to FIGS. 1 and 2, in FIGS. 4 and 5, first analog circuit layer 54, dielectric layer 56, and second analog circuit layer 58 are at least partially encapsulated between first electrically insulating layer 18 and second electrically insulating layer 22. In some examples, as shown in FIGS. 4 and 5, first electrically insulating layer 18 and second electrically insulating layer 22 may substantially fully encapsulate (e.g., fully or nearly fully encapsulate) first analog circuit layer 24, dielectric layer 56, and second analog circuit layer 58.

First analog circuit layer 54 and second analog circuit layer 58 may include an analog circuit. In some examples, first analog circuit layer 54 and second analog circuit layer 58 are electrically connected (e.g., conductively, inductively, or capacitively connected) to each other to form a single analog circuit, which may include a single electrical pathway or a plurality of electrical pathways. In other examples, first analog circuit layer 54 and second analog circuit layer 58 may include separate analog circuits (e.g., electrically isolated from each other). The analog circuit or analog circuits may be similar to or substantially the same (e.g., the same or nearly the same) as analog circuit 20 described in FIGS. 1 and 2. For example, the analog circuit(s) may include at least one analog circuit element, such as, but not limited to, at least one of a conductor, a resistor, a capacitor, an inductor, a transistor, a diode, a memristor, or the like.

In some examples, first analog circuit layer 54 may include a first electrical conductor and second analog circuit layer 58 may include a second electrical conductor. Dielectric layer 56 may separate first analog circuit layer 54 and second analog circuit layer 58. Dielectric layer 56 may include a dielectric material, such as, for example, an electrically insulating polymer or ceramic. In some examples, dielectric layer 56 may include a material similar to or substantially the same (e.g., the same or nearly the same) as first electrically insulating layer 18 and/or second electrically insulating layer 22.

In examples in which first analog circuit layer 54 includes a first electrical conductor, second analog circuit layer 58 includes second electrical conductor, and dielectric layer 56 separates first analog circuit layer 54 and second analog circuit layer 58, the first analog circuit layer 54, dielectric layer 56, and second analog circuit layer 58 may form a capacitor.

Similar to the description in FIG. 1, when first analog circuit layer 54 and second analog circuit layer 58 include separate conductive pathways or separate analog circuits, IC 12 may be configured to generate the first input by transmitting a first analog electrical signal through a first electrical pathway (e.g., first analog circuit layer 54) and analyzing the first modified analog electrical signal. Similarly, IC 12 may generate the second input by transmitting a second analog electrical signal through a second electrical pathway (e.g., second analog circuit layer 58) and analyzing the second modified analog electrical signal. When the first and second analog electrical pathways are different, the first and second modified electrical signals may be different.

Additionally, in some examples, the first and second analog electrical signals may be different, e.g., may include different frequency content. Using first and second inputs generated by transmitting an analog electrical signal through first and second electrical pathways of analog circuit 20 may increase a complexity of operation of IC 12 and active tamper-resistant coating 52, which may make successful reverse engineering of the contents of IC 12 or circuit configuration of IC 12 less likely. By including multiple analog circuit layers 54 and 58, complexity of active tamper-resistant coating 52 may be further increased, which may further make successful reverse engineering of the contents of IC 12 or circuit configuration of IC 12 less likely. Although not shown in FIGS. 4 and 5, additional layers may be used in active tamper-resistant coating 52, e.g., any number of alternating analog circuit layers and electrically insulating or dielectric layers.

In some examples, instead of the active tamper-resistant coating partially encapsulating IC 12, the active tamper-resistant coating may substantially fully encapsulate (e.g., fully or nearly fully encapsulate) IC 12. FIG. 6 is a conceptual diagram illustrating a side cross-sectional view of another example IC 12 substantially fully encapsulated by an active tamper-resistant coating 72. IC 12 and PB 16 may be similar to or substantially the same (e.g., the same or nearly the same) as described with reference to FIGS. 1 and 2. However, in contrast to PB 16 of FIG. 1, PB 16 shown in FIG. 6 includes four electrical traces 24a-24d.

Active tamper-resistant coating 72 may substantially fully (e.g., fully or nearly fully) encapsulate IC 12. Additionally, active tamper-resistant coating 72 may at least partially encapsulate PB 16. In some examples, as shown in FIG. 6, active tamper-resistant coating 72 may substantially fully encapsulate (e.g., fully or nearly fully encapsulate) PB 16. By substantially fully encapsulating IC 12 and PB 16, active tamper-resistant coating 72 may protect from a tampering attempt in which a reverse engineer accesses conductive traces of PB 16 from a backside of PB 16 (e.g., the bottom of PB 16 in FIG. 6).

The example system of FIG. 6 also includes an electromagnetic interference (EMI) shield 74 formed over active tamper-resistant coating 72. EMI shield 74 may block EM radiation generated by the analog electrical signals transmitted through active tamper-resistant coating 72 from propagating to an exterior of EMI shield 74. This may prevent a reverse engineer from measuring the EM radiation in an attempt to reverse engineer the analog electrical signals transmitted through active tamper-resistant coating. EMI shield 74 may include an electrically conductive or magnetic material, and may be formed as a substantially continuous layer (e.g., continuous or nearly continuous), a screen, a metal foam, a layer of electrically conductive ink, or the like.

In the example system of FIG. 6, active tamper-resistant coating 72 is a first active tamper-resistant coating 72 and IC 12 is a first IC 12. Active tamper-resistant coating 72 may be similar to or the same as active tamper-resistant coating 14 of FIGS. 1 and 2, active tamper-resistant coating 52 of FIGS. 4 and 5, or may have a different configuration. An analog circuit of first active tamper-resistant coating 72 electrically connected to IC 12 by first electrical trace 24a and second electrical trace 24b. First active tamper-resistant coating 72 substantially fully encapsulates (e.g., fully or nearly fully encapsulates) PB 16, first IC 12 and a second IC 78.

The example system of FIG. 6 also includes a second active tamper-resistant coating 76 that at least partially encapsulates a second IC 78. Second IC 78 may be electrically connected to an analog circuit of second active tamper-resistant coating 76 by third electrical trace 24c and fourth electrical trace 24d. Second IC 78 may be, for example, a memory IC, an ASIC, a FPGA, a general purpose processor, a system-on-a-chip, or the like. Second IC 78 and first IC 12 may have similar or different IC designs.

Second active tamper-resistant coating 76 may have a configuration similar to active tamper-resistant coating 14 of FIGS. 1 and 2, active tamper-resistant coating 52 of FIGS. 4 and 5, or may have a different configuration. Additionally, second active tamper-resistant coating 76 may have a similar configuration to first active tamper-resistant coating 72 or a different configuration. In this way, second active tamper-resistant coating 76 may provide redundant anti-tampering protection for second IC 78.

In some examples, instead of first IC 12 being electrically connected to only first active tamper-resistant coating 72 and second IC 78 being electrically connected to only second active tamper-resistant coating 76, first IC 12 may be electrically connected to both first active tamper-resistant coating 72 and second active tamper-resistant coating 76 and/or second IC 78 may be electrically connected to both first active tamper-resistant coating 72 and second active tamper-resistant coating 76.

Additionally, although FIG. 6 illustrates two ICs 12 and 78 mounted to PB 16, in other examples any number of electrical components, including ICs, resistors, inductors, capacitors, transformers, transistors, diodes, or the like may be mounted to PB 16. Some of the electrical components may be at least partially enclosed in their own active tamper-resistant coating (similar to second IC 78), while others may be substantially fully (e.g., fully or nearly fully) encapsulated by first active tamper-resistant coating 72 and may not be at least partially encapsulated in their own active tamper-resistant coating (similar to IC 12).

In this way, systems may include additional electrical components mounted to PB, additional active tamper-resistant coatings (which each may at least partially enclose single electrical components or multiple electrical components), and/or EMI shields 74. Various combinations of features may increase complexity of the anti-tampering system, which may render tampering with first IC 12 and/or second IC 78 less likely to succeed than in simpler systems.

Figure 7:
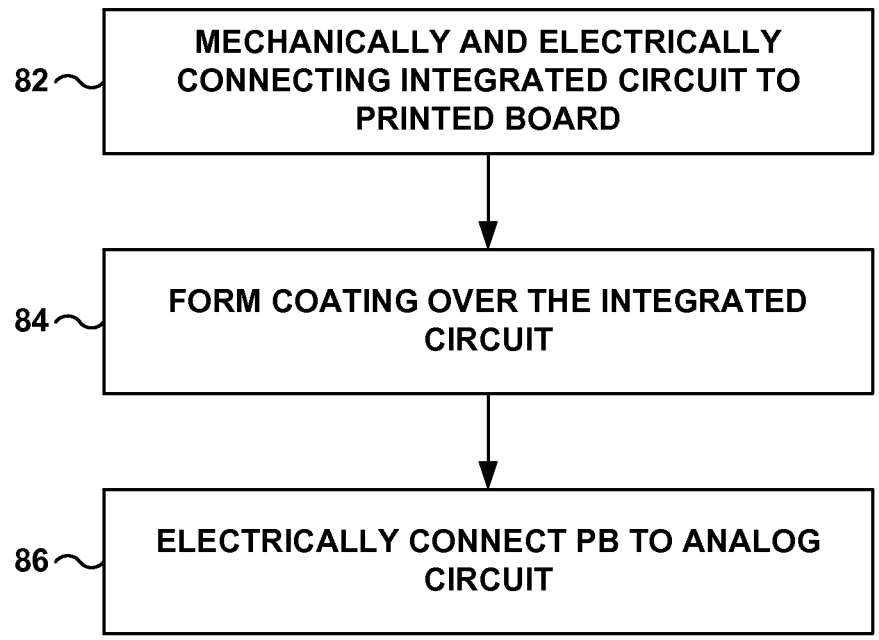
FIG. 7 is a flow diagram illustrating an example technique for forming an active tamper-resistant coating that at least partially encapsulates an IC.

FIG. 7 is a flow diagram illustrating an example technique for forming an active tamper-resistant coating that at least partially encapsulates an IC. The technique of FIG. 7 will be described with reference to the system illustrated in FIGS. 1 and 2 for ease of description only. The technique of FIG. 7 may be used to form systems including other active tamper-resistant coatings and/or other ICs and/or PBs.

The technique of FIG. 7 includes mechanically and electrically connecting IC 12 to PB 16 (82). In some examples, IC 12 may be electrically connected to electrical traces 24 of PB 16 using a plurality of wire bonds and mechanically connected to PB 16 using an adhesive. In other examples, IC 12 may be electrically and mechanically connected to PB 16 using a flip-chip technique, e.g., with solder bumps between conductive pads (not shown) on a surface IC 12 and conductive pads (not shown) on a surface of PB 16.

The technique of FIG. 7 also may include forming active tamper-resistant coating 14 over IC 12 to at least partially encapsulate IC 12 (84). In some examples, active tamper-resistant coating 14 may be formed over IC 12 to substantially fully (e.g., fully or nearly fully) encapsulate IC 12. Additionally, in some examples, active tamper-resistant coating 14 may be formed to at least partially encapsulate PB 16.

Active tamper-resistant coating 14 may include a plurality of layers, such as, for example, first electrically insulating layer 18, analog circuit 20, and second electrically insulating layer 22. In some examples, forming active tamper-resistant coating 14 over IC 12 to at least partially encapsulate IC 12 (84) may include forming first electrically insulating layer 18 over IC 12, forming analog circuit 20 over first electrically insulating layer 18, and forming second electrically insulating layer 22 over analog circuit 20.

For example, first electrically insulating layer 18 may be deposited over IC 12 and, optionally, at least a portion of PB 16 from a solution or in uncured state (e.g., in examples in which first electrically insulating layer 18 includes a polymer) by spraying, painting, dip coating, or the like.

Analog circuit 20 then may be formed on first electrically insulating layer 18. In some examples, analog circuit 20 may be formed by depositing analog electronic components on first electrically insulating layer 18. For example, one or more analog electronic components may comprise a conductive ink, and the one or more analog electronic components may be printed on first electrically insulating layer 18. As another example, one or more analog electronic components may comprise a conductive polymer, and the one or more analog electronic components may be printed on first electrically insulating layer 18. As another example, one or more analog electronic components may comprise a conductive metal, and the one or more analog electronic components may be formed on first electrically insulating layer 18 using a metal deposition technique.

Second electrically insulating layer 22 then may be formed over analog circuit 20 using any of the techniques described for forming first electrically insulating layer 18.

In other examples, forming active tamper-resistant coating 14 over IC 12 to at least partially encapsulate IC 12 (64) may include first forming active tamper-resistant coating 14 (including first electrically insulating layer 18, analog circuit 20, and second electrically insulating layer 22) as a separate structure, then disposing active tamper-resistant coating 14 around IC 12 (e.g., attaching active tamper-resistant coating 14 to IC 12 and/or PB 16).

The technique of FIG. 7 also includes electrically connecting analog circuit 20 to PB 16 (86). For example, during formation of analog circuit 20, one or more analog circuit elements may be electrically connected to one or both of electrical traces 24 of PB 16. Each of electrical traces 24 may include a respective conductive pad or contact on a surface of PB 16, and analog circuit 20 may be electrically connected to the conductive pads or contacts. For example, a conductor of analog circuit 20 may be formed physically contacting the pad, e.g., using a metal deposition technique, conductive polymer deposition technique, or printing technique for a conductive ink. Because electrical traces 24 are electrically connected to IC 12, electrically connecting analog circuit 20 to electrical traces 24 of PB electrically connects analog circuit 20 to IC 12.

Various examples have been described. These and other examples are within the scope of the following claims.

What is claimed is:

1. A system comprising:
    an integrated circuit; and
    a coating at least partially encapsulating the integrated circuit, wherein the coating comprises an electrically insulating material at least partially encapsulating an analog circuit, wherein the integrated circuit is electrically connected to the analog circuit, and wherein the integrated circuit is configured to:
    generate an analog electrical signal;
    transmit the analog electrical signal through the analog circuit to generate a modified analog electrical signal;
    receive the modified analog electrical signal;
    compare the modified analog electrical signal to an expected analog electrical signal; and
    in an instance in which the modified analog electrical signal is sufficiently similar to the expected analog electrical signal, use the modified analog electrical signal as an input to an algorithm performed by the integrated circuit to at least one of:
        generate a decryption key based at least in part on the modified analog electrical signal and decrypt data using the decryption key; or
        generate an encryption key based at least in part on the modified analog electrical signal and encrypt data using the encryption key.

2. The system of claim 1, wherein the expected analog electrical signal is determined based at least in part on frequency content of the analog electrical signal and a transfer function that describes an electrical response of the analog circuit.

3. The system of claim 1, wherein the analog circuit comprises at least one inductor, resistor, or capacitor.

4. The system of claim 1, further comprising a printed board, wherein the integrated circuit is electrically and physically connected to the printed board, and wherein the printed board comprises an electrical connection electrically connecting the integrated circuit and the analog circuit.

5. The system of claim 4, wherein the coating at least partially encapsulates the printed board.

6. The system of claim 5, wherein the coating substantially fully encapsulates the printed board.

7. The system of claim 1, wherein the coating substantially fully encapsulates the integrated circuit.

8. The system of claim 1, wherein the analog electrical signal comprises a first analog electrical signal, the modified analog electrical signal comprises a first modified analog electrical signal, the expected analog electrical signal comprises a first expected analog electrical signal, and the instance comprises a first instance, and wherein the analog circuit comprises a first electrical pathway and a second electrical pathway different than the first electrical pathway, and wherein the integrated circuit is configured to:
 transmit the first analog electrical signal through the first electrical pathway of the analog circuit to generate the first modified analog electrical signal;
 compare the first modified analog electrical signal to the first expected analog electrical signal;
 in an instance in which the first modified analog electrical signal is sufficiently similar to the first expected analog electrical signal, use the first modified analog electrical signal as a first input to the algorithm performed by the integrated circuit;
 generate a second analog electrical signal;
 transmit the second analog electrical signal through the second electrical pathway of the analog circuit to generate a second modified analog electrical signal;
 receive the second modified analog electrical signal;
 compare the second modified analog electrical signal to a second expected analog electrical signal; and
 in an instance in which the second modified analog electrical signal is sufficiently similar to the second expected analog electrical signal, use the second modified analog electrical signal as a second input to the algorithm performed by the integrated circuit.

9. The system of claim 8, wherein the first analog electrical signal comprises a first frequency content, and wherein the second analog electrical signal comprises a second frequency content different than the first frequency content.

10. The system of claim 1, wherein the electrically insulating material comprises a first layer and a second layer, and wherein the analog circuit is at least partially encapsulated between the first layer and the second layer.

11. The system of claim 10, further comprising an electromagnetic interference shield layer formed on the second layer.

12. The system of claim 1, wherein the analog electrical signal comprises a first analog electrical signal comprising a first frequency content, the modified analog electrical signal comprises a first modified analog electrical signal, the expected analog electrical signal comprises a first expected analog electrical signal, and the instance comprises a first instance, and wherein the integrated circuit is configured to:
 transmit the first analog electrical signal through the analog circuit to generate the first modified analog electrical signal;
 compare the first modified analog electrical signal to the first expected analog electrical signal;
 in an instance in which the first modified analog electrical signal is sufficiently similar to the first expected analog electrical signal, use the first modified analog electrical signal as a first input to the algorithm performed by the integrated circuit;
 generate a second analog electrical signal comprising a second frequency content different than the first frequency content;
 transmit the second analog electrical signal through the analog circuit to generate a second modified analog electrical signal;
 receive the second modified analog electrical signal;
 compare the second modified analog electrical signal to a second expected analog electrical signal; and
 in an instance in which the second modified analog electrical signal is sufficiently similar to the second expected analog electrical signal, use the second modified analog electrical signal as a second input to the algorithm performed by the integrated circuit.

13. The system of claim 1, wherein the integrated circuit is configured to, in an instance in which the integrated circuit determines the modified analog electrical signal is not sufficiently similar to the expected analog electrical signal, modify data stored by the integrated circuit.

14. A method comprising:
 mechanically and electrically connecting an integrated circuit to a printed board;
 forming a coating over the integrated circuit, wherein the coating at least partially encapsulates the integrated circuit, wherein the coating comprises an electrically insulating material at least partially encapsulating an analog circuit; and
 electrically connecting the printed board to the analog circuit to electrically connect the integrated circuit and the analog circuit, wherein the integrated circuit is configured to:
  generate an analog electrical signal;
  transmit the analog electrical signal through the analog circuit to generate a modified analog electrical signal;
  receive the modified analog electrical signal;
  compare the modified analog electrical signal to an expected analog electrical signal; and
  in an instance in which the modified analog electrical signal is sufficiently similar to the expected analog electrical signal, use the modified analog electrical signal as an input to an algorithm performed by the integrated circuit to at least one of:
   generate a decryption key based at least in part on the modified analog electrical signal and decrypt data using the decryption key; or
   generate an encryption key based at least in part on the modified analog electrical signal and encrypt data using the encryption key.

15. The method of claim 14, wherein forming the coating over the integrated circuit comprises:
 forming a first electrically insulating layer over the integrated circuit;
 forming the analog circuit over the first electrically insulating layer;
 forming a second electrically insulating layer over the analog circuit, wherein the first and second electrically insulating layers at least partially encapsulate the analog circuit.

16. A method comprising:
 generating, by an integrated circuit, an analog electrical signal, wherein the integrated circuit is at least partially encapsulated in a coating, wherein the coating comprises an electrically insulating material at least partially encapsulating an analog circuit;
 transmitting, by the integrated circuit, the analog electrical signal through the analog circuit to generate a modified analog electrical signal;
 receiving, by the integrated circuit, the modified analog electrical signal;
 comparing the modified analog electrical signal to an expected analog electrical signal; and
 in an instance in which the modified analog electrical signal is sufficiently similar to the expected analog electrical signal, using, by the integrated circuit, the modified analog electrical signal as an input to an algorithm performed by the integrated circuit to at least one of:
generate a decryption key based at least in part on the modified analog electrical signal and decrypting data using the decryption key or
generate an encryption key based at least in part on the modified analog electrical signal and encrypting data using the encryption key.

17. The method of claim 16, wherein generating the analog electrical signal comprises generating a first analog electrical signal, wherein transmitting the analog electrical signal through the analog circuit to generate a modified analog electrical signal comprises transmitting the first analog electrical signal through a first electrical pathway of the analog circuit to generate a first modified analog electrical signal, wherein receiving the modified analog electrical signal comprises receiving the first modified analog electrical signal, wherein comparing the modified analog electrical signal to the expected analog electrical signal comprises comparing the first modified analog electrical signal to a first expected analog electrical signal, and wherein, in the instance in which the modified analog electrical signal is sufficiently similar to the expected analog electrical signal, using the modified analog electrical signal as an input to an algorithm performed by the integrated circuit comprises, in that the instance in which the first modified analog electrical signal is sufficiently similar to a first expected analog electrical signal, using the first modified analog electrical signal as a first input to an algorithm performed by the integrated circuit, the method further comprising:
generating, by the integrated circuit, a second analog electrical signal;
transmitting, by the integrated circuit, the second analog electrical signal through a second electrical pathway of the analog circuit to generate a second modified analog electrical signal;
receiving, by the integrated circuit, the second modified analog electrical signal;
comparing the second modified analog electrical signal to a second expected analog electrical signal; and
in a second instance in which the second modified analog electrical signal is sufficiently similar to the second expected analog electrical signal, use the second modified analog electrical signal as a second input to the algorithm performed by the integrated circuit.

* * * * *